Nov. 24, 1959 D. R. YOUNG 2,914,735

SUPERCONDUCTOR MODULATOR CIRCUITRY

Filed Sept. 30, 1957

*INVENTOR.*
DONALD R. YOUNG

*BY*

John E. Dougherty Jr.
ATTORNEY

United States Patent Office 2,914,735

Patented Nov. 24, 1959

2,914,735

SUPERCONDUCTOR MODULATOR CIRCUITRY

Donald R. Young, Poughkeepsie, N.Y., assignor to International Business Machines Corporation, New York, N.Y., a corporation of New York Application September 30, 1957, Serial No. 687,225

12 Claims. (Cl. 332—51)

The present invention relates to cryogenic circuitry and more particularly to modulating and gating circuits which employ magnetic shields of superconductor material.

Materials which are known as superconductors are so termed because of the fact that, when cooled below particular critical temperatures in the vicinity of absolute zero, they undergo transitions whereby they become essentially perfect conductors or, differently stated, they lose all measurable electrical resistance. The term superconductivity is descriptive of this property but there are other properties of these materials which also change remarkably as the materials are cooled below their transition temperatures. One such property is the magnetic permeability of superconductor materials which, when these materials are in a superconductive state, becomes essentially zero and the materials, therefore, are essentially perfect magnetic shields. This magnetic shielding property of superconducting materials may be attributed to the fact that when applied magnetic fields are built up or collapsed in the vicinity of a superconductive body so as to either impinge upon or attempt to link the body, currents are induced in closed current paths in the superconductive material, which may be termed closed superconductive loops. Since the material is essentially a perfect conductor, these currents are capable of producing magnetic fields which are equal and opposite to the applied fields. These equal and opposite fields, therefore, prevent applied fields from causing any net change in the magnetic field linking a superconductive body and, when the applied field impinges directly on the body, so to speak, thrusts out the applied field.

Each of the known superconductor materials undergoes a transition from a normal or resistive state to a superconductive state at a particular temperature in the vicinity of absolute zero. The transition temperature for any such material can be lowered by applying a magnetic field to the material as it is cooled down and a material having superconductive properties, which is maintained at a temperature below the temperature at which it undergoes a transition from a normal to a superconductive state, may be driven back to its normal state by the application of a magnetic field of sufficient intensity. These characteristics of various superconductors, as well as means for attaining low temperatures in the vicinity of absolute zero, are described in the work entitled "Superconductivity," by D. Schoenberg, the second edition of which was published by the Syndics of the Cambridge University in 1952; and in an article by D. A. Buck entitled "The Cryotron" which appeared in the April, 1956, issue of the Proceedings of the IRE, pp. 482–493.

One object of the present invention is to provide improved modulating and/or gating circuitry utilizing the magnetic shielding properties of a body of superconductor material.

This object, and other objects set forth below, are achieved, as is illustrated in the accompanying description of a preferred embodiment of the invention, by constructing a modulating circuit utilizing an essentially flat sheet of superconductor material to separate a pair of coil conductors, one of which is employed to apply input signals to the circuit and the other of which is employed to derive modulated output signals. The sheet is provided with an opening positioned through the sheet in a direction transverse to the plane in which the sheet extends. The input and output coils are arranged in planes which are parallel to the plane of the sheet. The modulating signals are applied by way of a conductor which is arranged to extend through the coils and the opening in the sheet of superconductor material and to be perpendicular to the planes of the sheets and coils at the points at which it intersects these planes. The sheet of superconductor material is maintained at a temperature below its superconductive transition temperature and thus, when no signal is applied to the modulating conductor, the input and output coils are effectively shielded from each other. When signals are applied to the modulating conductor, magnetic fields are produced which drive portions of the superconducting shield from a superconductive to a normal state. The intensity of the field and, thus, the magnitude of the applied modulating signal, necessary to destroy superconductivity in a sufficient portion of the material to allow magnetic coupling to be established between input coil and output coil, is dependent upon the superconductor material employed, the operating temperature, and the geometry of the structure. As fields in excess of this minimum field are applied, more and more of the superconductor material is driven normal, thus in--creasing the magnetic coupling between the coils. The transmission of signals between input coil and output coil may be continuously modulated by applying varying signals to the modulating conductor. The circuit may also be employed as a modulating circuit of the on-off type to gate or control the transmission of individual discrete pulses or series of such pulses from input to output coil by applying pulses of a predetermined magnitude, in excess of that necessary to establish the minimum field necessary for coupling, to the modulating conductor. Because of the shielding properties of the superconductor material, the gate circuit is effective to allow transmission of signals from input to output coil only when a signal is applied to the modulating or control conductor. An important advantage which is realized follows from the fact that, with the geometry utilized, the modulating or control conductor is not magnetically coupled to either the input or the output coil and, thus, signals applied to the modulaitng conductor do not induce spurious signals in either of these coils but are effective only to control the magnetic coupling therebetween by controlling the state of the superconductor shield.

Thus, a further object of the invention is to provide an improved circuit for modulating the transmission of signals between first and second conductors, wherein the conductors are separated by a superconductor shield, portions of which are selectively driven from a superconductive to a normal state by a magnetic field produced by the application of energizing signals to a third conductor arranged adjacent the shield.

A further object is to provide a circuit of this type wherein the said conductors are so arranged that there is no magnetic coupling between either of said first and second conductors and said third conductor.

Still a further object is to provide a circuit for modulating the transmission of signals between first and second coils of the same configuration wherein the coils are arranged in parallel planes adjacent opposite sides of a sheet of superconductive material having an opening extending therethrough and said modulation is accomplished by applying signals to a control conductor arranged to extend perpendicular to said planes through said coils and the opening in the superconductive sheet.

Other objects of the invention will be pointed out in the following description and claims and illustrated in the accompanying drawings, which disclose, by way of example, the principle of the invention and the best mode, which has been contemplated, of applying the principle.

Figures 1, 2:
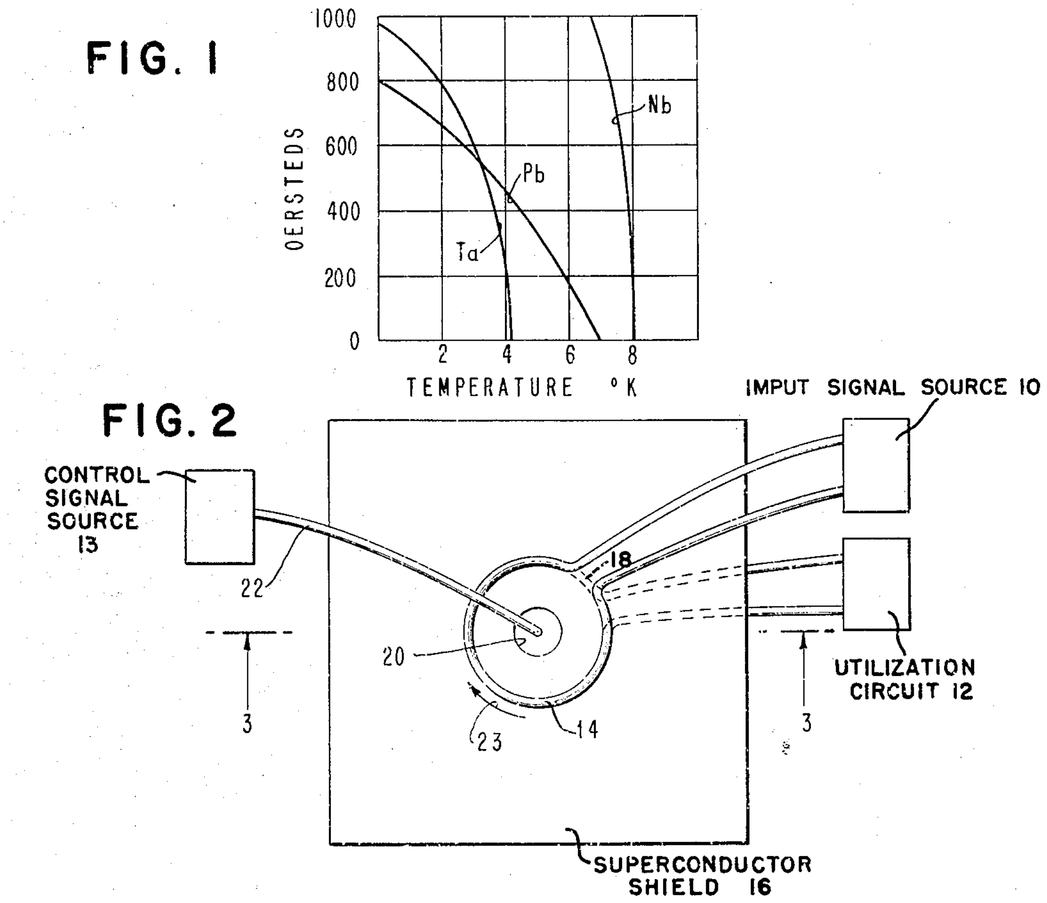
Fig. 1 is a plot of magnetic field versus temperature wherein the transitions between normal and superconductive states for various materials are depicted.
Fig. 2 is a plan view, partly schematic, of a preferred embodiment of the invention.

There is shown in Fig. 1 a plot depicting the transition temperatures (T) for a plurality of materials in the presence of different values of magnetic field (H). For example, tantalum (Ta) is shown to undergo a transition from a normal to a resistive state at 4.4° K. when no magnetic field is present. This transition temperature is lowered as the magnetic field applied to the material is increased. The state of the various materials, superconductive or normal, for different temperature and field conditions is ascertained by whether or not the particular condition is represented to the left or the right of the transition curve for the material; temperature-field conditions to the left of the curve indicating a superconductive state and to the right of the curve indicating a normal state. For example, considering tantalum maintained at a temperature of 4.2° K. which is a convenient temperature since it is the boiling temperature of liquid helium at atmospheric pressure, the material is in a superconductive state as long as the magnetic field to which it may be subjected is below a threshold value shown in the plot to be about 85 oersteds. When this value of magnetic field is exceeded, superconductivity is quenched, that is, the material undergoes a transition to the normal or resistive state. From the plot it also appears that, at this operating temperature, there are other materials which remain in a superconductive state in the presence of a field in excess of the critical or threshold field for tantalum.

There is shown in Fig. 2 a plan view of the structure of a modulating circuit constructed in accordance with the principles of the invention. The purpose of the circuit is to modulate the transmission of signals, applied by a signal source 10 to the circuit, and deliver the signals in modulated form to a further utilization circuit schematically represented in Fig. 2 by the box 12. The modulating or control signals for the circuit are supplied by a signal source 13. The input signals supplied by source 10 are applied to an input coil 14 which is mounted on the upper side of a sheet of superconductor material 16. The sheet 16 may, for the illustrative purposes of this disclosure, be tantalum and be maintained at a temperature of 4.2° K. which, as before stated, is the boiling temperature of liquid helium at atmospheric pressure. The tantalum, when maintained at this temperature, is normally in a superconductive state but, as is indicated in Fig. 1, can be driven to a normal state by the application of a magnetic field having an intensity of about 85 oersteds. The modulated outputs for the circuit are developed on a second coil 18 (see Fig. 3) which coil has the same configuration as coil 14 and is mounted immediately beneath coil 14 on the opposite side of sheet 16. The superconductive sheet 16 is provided with an opening 20 which is positioned through the sheet in a direction perpendicular to the plane in which the sheet 16 extends. The coils 14 and 18 mounted on opposite sides of sheet 16 are arranged in planes both of which are parallel to the plane of sheet 16.

Control or modulating signals are applied to the circuit by a drive conductor 22 which is coupled to signal source 13 and is arranged to extend through the opening 20 in sheet 16 in a direction perpendicular to the plane of both the sheet 16 and the coils 14 and 18. The input signals applied to coil 14 are of insufficient magnitude to drive the superconductor material of sheet 16 from a superconductive to a normal state. When, with no signal applied by source 13 to drive conductor 20, an input signal is supplied by source 10 to input coil 14, the superconductor sheet 16 prevents any appreciable signal from being induced on the output coil 18. This is due to the fact that, though some amount of flux may then couple the coils 14 and 18 through opening 20, any appreciable flux linkage between coils 14 and 18 would necessarily have to encompass a portion of the superconductive material 16. The establishing of magnetic field extending downward in Fig. 1 within the coil 14, in response to the application of a current signal to that coil, causes a corresponding current to be established in a circular direction in a closed superconductive current path or loop formed by the sheet 16 around opening 20. This current in turn produces an opposing magnetic field equal to that applied by the energized coil 14, thereby making it impossible to appreciably change the net flux linking the output coil 16 as long as the portion of sheet 16 also linked remains in a superconductive state. Thus, when signals are applied to coil 14 with all of sheet 16 in a superconductive state, no appreciable outputs are induced on output coil 18. When a signal is applied by signal source 13 to conductor 20, a magnetic field extending in the plane of sheet 16 is produced, which field, when the signal applied is of sufficient magnitude, causes the portions of the superconductor material immediately adjacent opening 20 to be driven to a normal state. The intensity of the magnetic field produced by energizing drive conductor 22 is strongest at points immediately adjacent this conductor and decreases as the field extends outwardly in circular fashion from the conductor. Therefore, increasing magnitudes of signal applied to conductor 22 are effective to drive increasingly larger circular portions of the superconductor material around opening 16 into a normal state.

In order to allow magnetic coupling between coils 14 and 18, it is necessary to provide a flux path surrounding these coils which does not include within it any superconductive material. Therefore, for any appreciable output to be produced on coil 18, in response to a signal applied to coil 14, it is necessary that the magnitude of the signal applied to conductor 22 be sufficient to drive a circular portion of the material of sheet 16 which extends outwardly of coils 14 and 16 from a superconductor to a normal state. When such a minimum signal is applied, the application of a signal to coil 16 is effective to induce an output signal in coil 18. However, when only such a minimum drive signal is applied, all of the flux lines, which, for the direction of current flow in coil 14 indicated by an arrow 23, extend downwardly within this coil in Fig. 2, must necessarily return upward to complete a closed flux path through the narrow circular portion of the superconductive material which is then in a normal state. As a result, when a minimum control signal is applied to conductor 22, there is relatively poor flux linkage between coils 14 and 18 and, therefore, only relatively small signals are induced on coil 18 in response to the signals applied to coil 14. As the magnitude of the signals applied by conductor 22 is increased thereby driving increasing portions of sheet 16 into a normal state, the width of the circular return flux path is increased thereby improving the flux linkage between coils 14 and 18 and increasing the magnitude of the output signals induced on coil 18.

It should be apparent that, since the degree of magnetic coupling between coils 14 and 18 is dependent on the magnitude of the signals applied to conductor 22, these latter signals are effective to modulate the transmission of signals from coil 14 to coil 18. This may be accomplished, for example, by continuously applying an input alternating current signal to coil 14 and applying a varying signal to conductor 22. No appreciable output signal will be induced on coil 18 except when the signal applied to conductor 22 is of sufficient magnitude to drive a circular portion of the sheet 16 which extends outside the coils 14 and 18 from a superconductive to a normal state and the magnitude of the output pulse is increased as the magnitude of the input signal above this minimum signal is increased.

The modulating circuit of Fig. 2 may be also used as a gating circuit to gate the transmission of single discrete pulses or series of such pulses from signal source 10 to the utilization device 20 through coils 14 and 18. The gating circuit is opened to allow transmission of signals from coils 14 to 18 by the application of a signal by source 13 to conductor 22, which signal is of sufficient magnitude to drive at least a portion of the plane 16 extending beyond coils 14 and 18 from a superconductive to a normal state. As long as such a signal is applied by source 13, discrete output signals will be induced on coil 18 in response to the application of discrete input signals to coil 14.

Figure 3:
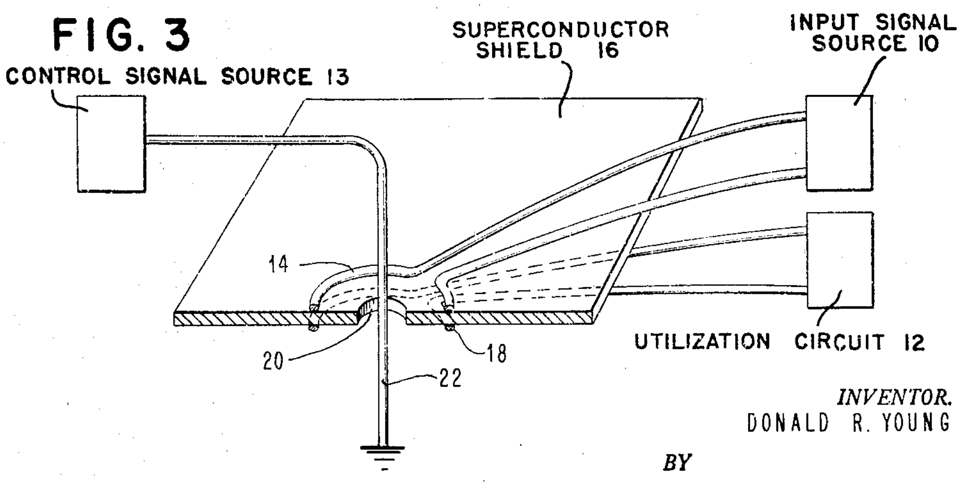
Fig. 3 is an isometric view taken along the lines 3—3 of Fig. 2.

Note should be made of the fact that since the conductor 22 is arranged to extend in a direction perpendicular to the parallel planes in which coils 14 and 18 are arranged, these coils are not magnetically coupled to conductor 22. This is due to the fact that the magnetic field generated by energizing conductor 22 extends in planes which are parallel to the planes in which the coils are located and, therefore, are ineffective to change the number of flux lines linking either of these coils. Thus, with this geometry, the signals applied to conductor 22 serve the sole function of controlling the magnetic coupling between coils 14 and 18 by driving selected portions of the superconductor material of sheet 16 into a normal state, and the gate or control signals are effectively isolated from both the input and output circuitry since signals on conductor 22 do not induce any voltages on coils 14 and 18. Further, since, as before stated, it is necessary to drive resistive a portion of the plane 16 which extends beyond the input and output coils 14 and 18 in order to allow transmission of signals between these coils, it should be apparent that the minimum signal which must be applied to conductor 22 to accomplish this effect depends not only upon the characteristics of the superconductor material utilized and the operating temperature at which it is maintained but also upon the geometry, or here more specifically the diameter, of the input and output coils. As the diameter of these coils is decreased, the minimum signal necessary to provide for minimum magnetic coupling between the coils is also decreased since the extent of the portion of the material of plane 16 which must be driven from a superconductive to a normal state to accomplish minimum coupling is lessened. It should be also noted that it is preferable for more efficient magnetic coupling between the coils, when signals in excess of the minimum signal are applied to conductor 22, that the coils be of the same configuration and mounted exactly opposite each other as is indicated in the drawings of Figs. 2 and 3.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A superconductor gating circuit comprising a sheet of material having superconductor properties extending in a first plane and having an opening positioned therethrough in a direction perpendicular to said first plane, said material being maintained at a temperature below the temperature at which it undergoes a transition from a normal to a superconductive state in the absence of a magnetic field, an input coil for said gating circuit arranged adjacent one side of said sheet in a second plane parallel to said first plane, an output coil for said gating circuit arranged adjacent the other side of said sheet in a third plane adjacent said first plane, said coils being coaxial with each other and with said opening in said sheet and of substantially equal diameter, and a control conductor for said gating circuit extending through said coils and said opening and arranged to be perpendicular to said first, second, and third planes at the points at which it extends through said planes, and means for energizing said control conductor to drive portions of said sheet from a superconductive to a normal state to thereby control magnetic coupling between said input and output coils.

2. A superconductor gating circuit comprising a sheet of material having superconductor properties extending in a first plane and having an opening positioned therethrough in a direction perpendicular to said first plane, said material being maintained at a temperature below the temperature at which it undergoes a transition from a normal to a superconductive state in the absence of a magnetic field, an input coil for said gating circuit arranged adjacent one side of said sheet in a second plane parallel to said first plane, an output coil for said gating circuit arranged adjacent the other side of said sheet in a third plane adjacent said first plane, and a control conductor for said gating circuit extending through said coils and said opening and arranged to be perpendicular to said first, second, and third planes at the points at which it extends through said planes, and means for energizing said control conductor to drive portions of said sheet from a superconductive to a normal state to thereby control magnetic coupling between said input and output coils.

3. In a superconductor circuit, a sheet comprising material having superconductor properties extending in a first plane and having an opening positioned therethrough in a direction perpendicular to said first plane, said material being maintained at a temperature below the temperature at which it undergoes a transition from a normal to a superconductive state in the absence of a magnetic field, an input conductor for said circuit arranged adjacent said opening on one side of said sheet in a second plane parallel to said first plane, an output conductor for said gating circuit arranged adjacent said opening on the other side of said sheet in a third plane adjacent said first plane, and a control conductor for said gating circuit extending through said opening and arranged to be perpendicular to said first, second, and third planes at the points at which it extends through said planes, and means for energizing said control conductor to drive portions of said sheet from a superconductive to a normal state to thereby modulate the transmission of signals from said input to output conductor.

4. A superconductor circuit comprising a sheet of material having superconductor properties extending in a first plane and having an opening positioned therethrough in a direction perpendicular to said first plane, said material being maintained at a temperature below the temperature at which it undergoes a transition from a normal to a superconductive state in the absence of a magnetic field and exhibiting characteristic magnetic shielding properties when in said superconductive state, an input coil for said gating circuit arranged around said opening on one side of said sheet in a second plane parallel to said first plane, an output coil for said gating circuit arranged around said opening on the other side of said sheet in a third plane adjacent said first plane, and a control conductor for said circuit extending through said coils and said opening and arranged to be perpendicular to said first, second, and third planes at the points at which it extends through said planes.

5. In a circuit for producing, in response to input signals applied to a first conductor, output signals on a second conductor modulated in accordance with control signals applied to a third conductor; a sheet of material having superconductor properties extending in a first plane, said material being maintained at a temperature below the temperature at which it undergoes a transition from a normal to a superconductive state in the absence of a magnetic field and exhibiting characteristic magnetic shielding properties when in said superconductive state, said first conductor for applying input signals to said circuit being arranged adjacent one side of said sheet in a second plane parallel to said first plane, said second conductor for producing output signals for said circuit being arranged adjacent the other side of said sheet in a third plane adjacent said first plane, said third conductor for applying control signals to said circuit being arranged to extend through said first, second and third planes and being perpendicular to said planes at the points at which it extends through said planes, said third conductor being effective in response to control signals applied thereto to drive portions of said sheet from a superconductive to a normal state to thereby control magnetic coupling between said input and output conductors.

6. In a circuit for producing, in response to input signals applied to a first conductor, output signals on a second conductor modulated in accordance with control signals applied to a third conductor; a shield of material having superconductor properties separating said first and second conductors, said material being maintained at a temperature below the temperature at which it undergoes a transition from a superconducting to a normal state in the absence of a magnetic field, said signals applied to said third conductor being effective to produce magnetic fields sufficient to drive at least portions of said shield from a superconductive to a normal state, said first, second, and third conductors being so arranged that said magnetic fields produced by signals applied to said third conductor are ineffective to induce signals on either of said first and second conductors.

7. A modulating circuit comprising input and output conductors respectively arranged on opposite sides of a sheet of superconductive material, said input and output conductors and said sheet being arranged, respectively, in first, second, and third parallel planes, and a control conductor arranged adjacent said sheet for controlling magnetic coupling between said input and output conductors by applying magnetic fields to said sheet of superconductive material, said control conductor being arranged to intersect said first, second, and third parallel planes at points adjacent said first conductor, said second conductor and said sheet, respectively, and being perpendicular to said planes at said points of intersection.

8. In a circuit for producing, in response to input signals applied to a first conductor, output signals on a second conductor in accordance with control signals applied to a third conductor; a body of superconductor material so mounted with respect to said first and second conductors that it is effective when in a superconductive state to serve as a magnetic shield therebetween, said material being normally in a superconductive state but being capable of being driven to a normal state, said third conductor being so arranged with respect to said body of superconductor material and said second conductor that said signals applied thereto are effective to cause to be produced magnetic fields sufficient to drive at least portions of said body from a superconductive to a normal state but are ineffective to magnetically induce signals in said second conductor.

9. In a circuit for producing, in response to input signals applied to a first conductor, output signals on a second conductor in accordance with control signals applied to a third conductor; a shield of superconductor material so mounted with respect to said first, second and third conductors that it is effective to control magnetic coupling between said first and second conductors in accordance with signals applied to said third conductor which signals are ineffective to induce signals on at least one of said first and second conductors.

10. The invention as claimed in claim 9 wherein said signals applied to said third conductor are ineffective to induce signals on either of said first and second conductors.

11. In a circuit for controlling the transmission of signals between first and second coaxially arranged coil conductors, a body of superconductor material so mounted with respect to said coil conductors that it is effective when in a superconductive state to serve as a magnetic shield to prevent the transmission of signals between said coil conductors, means for maintaining said superconductor material at a temperature at which it is in a superconductive state in the absence of a magnetic field, and control means for said circuit comprising means effective when energized to produce a magnetic field sufficient to drive at least a portion of said superconductor material from a superconductive to a normal state, said control means being so oriented with respect to said first and second coil conductors that said field produced by said control means is substantially at right angles to the axes of the coil conductors.

12. In a circuit for producing, in response to input signals applied to a first conductor, output signals on a second conductor modulated in accordance with control signals applied to a third conductor; said first and second conductors being so mounted that magnetic fields produced by signals applied to the first conductor link the second conductor; a body of superconductor material forming a closed superconductor loop; said body of superconductor material being so mounted with respect to said first and second conductors that said magnetic fields produced by current signals in said first conductor also link said superconductor loop; means maintaining said body of superconductor material at a temperature at which it is superconductive in the absence of a magnetic field; said signals applied to said third conductor being effective to produce magnetic fields sufficient to drive at least portions of said body forming said loop from a superconductive to a normal state, said first, second, and third conductors being so arranged that said magnetic fields produced by signals applied to said third conductor are ineffective to induce signals on either of said first and second conductors.

No references cited.